United States Patent
Park et al.

(10) Patent No.: US 11,269,584 B2
(45) Date of Patent: Mar. 8, 2022

(54) DISPLAY SYSTEM, CONTROL METHOD OF THE DISPLAY SYSTEM, AND DISPLAY APPARATUS

(71) Applicant: Samsung Electronics Co., Ltd., Suwon-si (KR)

(72) Inventors: Younggyoo Park, Suwon-si (KR); Jihoon Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/112,142

(22) Filed: Dec. 4, 2020

(65) Prior Publication Data
US 2021/0173604 A1 Jun. 10, 2021

(30) Foreign Application Priority Data
Dec. 6, 2019 (KR) .......... 10-2019-0161441

(51) Int. Cl.
| | |
|---|---|
| G06F 3/147 | (2006.01) |
| G09F 9/30 | (2006.01) |
| G06F 3/045 | (2006.01) |
| G06F 3/042 | (2006.01) |
| G06F 3/044 | (2006.01) |

(52) U.S. Cl.
CPC ........... *G06F 3/147* (2013.01); *G09F 9/30* (2013.01); *G06F 3/044* (2013.01); *G06F 3/045* (2013.01); *G06F 3/0428* (2013.01)

(58) Field of Classification Search
CPC . G09F 9/30; G09F 27/00; G06F 3/147; G06F 3/045; G06F 3/044; G06F 3/0428
See application file for complete search history.

(56) References Cited

U.S. PATENT DOCUMENTS

| | | | |
|---|---|---|---|
| 8,893,175 B2* | 11/2014 | Kim | H04N 21/6547 725/34 |
| 9,875,719 B2 | 1/2018 | Eckhoff et al. | |
| 10,304,231 B2* | 5/2019 | Saito | G06F 3/0485 |
| 2009/0254416 A1 | 10/2009 | Nomula | |

(Continued)

FOREIGN PATENT DOCUMENTS

| | | |
|---|---|---|
| JP | 5271757 | 5/2013 |
| KR | 10-1141904 | 5/2012 |

(Continued)

OTHER PUBLICATIONS

International Search Report dated Apr. 6, 2021 in International Patent Application No. PCT/KR2020/017479.

*Primary Examiner* — Muhammad N Edun
(74) *Attorney, Agent, or Firm* — Staas & Halsey LLP

(57) ABSTRACT

A display system for improving delivery power of content by outputting content considering a user's moving path, a control method of the display system, and a display apparatus. The control method of the display system, according to an embodiment of the disclosure, includes generating path information to be used to output contents to at least two display apparatuses of a plurality of display apparatuses based on user information; determining content-of-interest based on the user information; and outputting the determined content-of-interest to at least one display apparatus of the plurality of display apparatuses based on the generated path information.

23 Claims, 15 Drawing Sheets

(56) References Cited

U.S. PATENT DOCUMENTS

| | | | | |
|---|---|---|---|---|
| 2012/0079419 A1* | 3/2012 | Ajitomi | ............... | G06F 9/451 |
| | | | | 715/781 |
| 2013/0286046 A1 | 10/2013 | Rodriguez | | |
| 2015/0081435 A1* | 3/2015 | Griffiths | ............ | G06Q 30/0255 |
| | | | | 705/14.53 |
| 2016/0219411 A1 | 7/2016 | Tenant de la Tour et al. | | |

FOREIGN PATENT DOCUMENTS

| | | |
|---|---|---|
| KR | 10-1595972 | 2/2016 |
| KR | 10-2018-0096418 | 8/2018 |

\* cited by examiner

11:00 USA HAWAII
12:00 VIETNAM HA LONG BA
13:00 MALDIVES
14:00 FRANCE PARIS

DISPLAY SYSTEM, CONTROL METHOD OF THE DISPLAY SYSTEM, AND DISPLAY APPARATUS

CROSS-REFERENCE TO RELATED APPLICATIONS

This application is based on and claims priority under 35 U.S.C. § 119 to Korean Patent Application No. 10-2019-0161441, filed on Dec. 6, 2019 in the Korean Intellectual Property Office, the disclosures of which are incorporated by reference herein in its entirety.

BACKGROUND

1. Field

The disclosure relates to a display system for outputting content, a control method of the display system, and a display apparatus.

2. Description of the Related Art

Recently, with the spread of digital culture, consumers' life patterns and the scale and tendency of the advertisement industry are changing. For example, flat panel television companies are launching pioneering the electronic advertising market called "Digital Signage". The Digital Signage, which is a communication tool for inducing marketing of companies, advertisement, training effects, and customer experiences, is a digital imaging apparatus that provides information content, game content, etc., as well as advertisement content such as moving images or still images, in public places such as hotels or hospitals. The Digital Signage transfers content that is fit for time, place, and purpose to the public in real time, and accordingly, the Digital Signage is emerging as a new information and advertisement transfer system.

SUMMARY

Therefore, it is an aspect of the disclosure to provide a display system for improving delivery power of content by outputting content considering a user's moving path, a control method of the display system, and a display apparatus.

Additional aspects of the disclosure will be set forth in part in the description which follows and, in part, will be obvious from the description, or may be learned by practice of the disclosure.

In accordance with an embodiment of the disclosure, a method of controlling a display system includes: generating path information including at least two display apparatuses of a plurality of display apparatuses based on user information; determining content-of-interest based on the user information; and outputting the content-of-interest to at least one display apparatus included in the path information.

The content-of-interest may include target content and indirect content corresponding to the target content, and the outputting of the content-of-interest to the at least one display apparatus may include outputting target content to a display apparatus included in the path information based on position information of the display apparatus, and outputting the indirect information to another display apparatus included in the path information.

The outputting of the content-of-interest to the at least one display apparatus may include outputting the target content to the display apparatus based on the user information and the position information.

The outputting of the content-of-interest to the at least one display apparatus may include outputting, when the user information changes, the target content to the display apparatus based on the changed user information.

The outputting of the content-of-interest to the at least one display apparatus may include determining an output time of the content-of-interest.

The outputting of the content-of-interest to the at least one display apparatus may include performing a control operation of outputting the content-of-interest to the at least one display apparatus at predefined time intervals.

The generating of the path information may include generating the path information based on the position information of the display apparatus, and the outputting of the content-of-interest to the at least one display apparatus may include determining the display apparatus outputting the target content and the other display apparatus outputting the indirect content.

The outputting of the content-of-interest to the at least one display apparatus may include corresponding the at least one display apparatus of the plurality of display apparatuses to the path information.

The outputting of the content-of-interest to the at least one display apparatus may include grouping the path information corresponding to the position information of the display apparatus and the at least one display apparatus of the plurality of display apparatuses.

The plurality of display apparatuses may include at least one communication module, and the outputting of the content-of-interest to the at least one display apparatus may include performing a control operation of outputting the content-of-interest based on communication between the at least one communication module and a user equipment (UE).

The outputting of the content-of-interest to the at least one display apparatus may include: receiving a position information signal of the UE; and performing a control operation of outputting the content-of-interest based on a relation between the plurality of display apparatuses and the position information signal.

The user information may include at least one piece of information of departure point information, stop information, destination information, age information, or gender information.

In accordance with an embodiment of the disclosure, a display system includes: a plurality of display apparatuses; a first server configured to provide user information; and a second server configured to receive the user information from the first server, wherein the first server is configured to determine path information including at least two display apparatuses of the plurality of display apparatuses based on the user information, and the second server is configured to determine content-of-interest based on the user information, and output the content-of-interest to at least one display apparatus included in the path information received from the first server.

The content-of-interest may include target content and indirect content corresponding to the target content, and the second server may output target content to a display apparatus included in the path information based on position information of the display apparatus, and output the indirect information to another display apparatus included in the path information.

The second server may output the target content to the display apparatus based on the user information.

The second server may output, when the user information changes, the target content to the display apparatus based on the changed user information.

The second server may determine an output time of the content-of-interest.

The second server may perform a control operation of outputting the content-of-interest to the other display apparatus at predefined time intervals.

The second server may further include: a path determiner configured to determine the path information based on position information of the display apparatus; and an apparatus determine configured to determine the display apparatus outputting the target content and the other display apparatus outputting the indirect content.

The second server may correspond the at least one display apparatus of the plurality of display apparatuses to the path information.

The second server may group the path information corresponding to the position information of the display apparatus and the at least one display apparatus of the plurality of display apparatuses.

The plurality of display apparatuses may include at least one communication module, and the second server may perform a control operation of outputting the content-of-interest based on communication between the at least one communication module and a user equipment (UE).

The second server may receive a position information signal of the UE, and perform a control operation of outputting the content-of-interest based on a relation between the plurality of display apparatuses and the position information signal.

The user information may include at least one piece of information of departure point information, stop information, destination information, age information, or gender information.

The second server may be provided in the at least one display apparatus.

In accordance with an embodiment of the disclosure, a display apparatus includes: a display; a content receiver configured to receive content-of-interest; and a controller configured to output the content-of-interest determined based on another piece of content-of-interest output from another display apparatus and path information including the other display apparatus to the display.

The display apparatus according to an embodiment of the disclosure may further include a communication module configured to receive a signal of a User Equipment (UE), wherein the controller outputs the content-of-interest based on communication between the communication module and the UE.

The communication module may receive a position information signal of the UE, and the controller may output the content-of-interest based on the position information signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
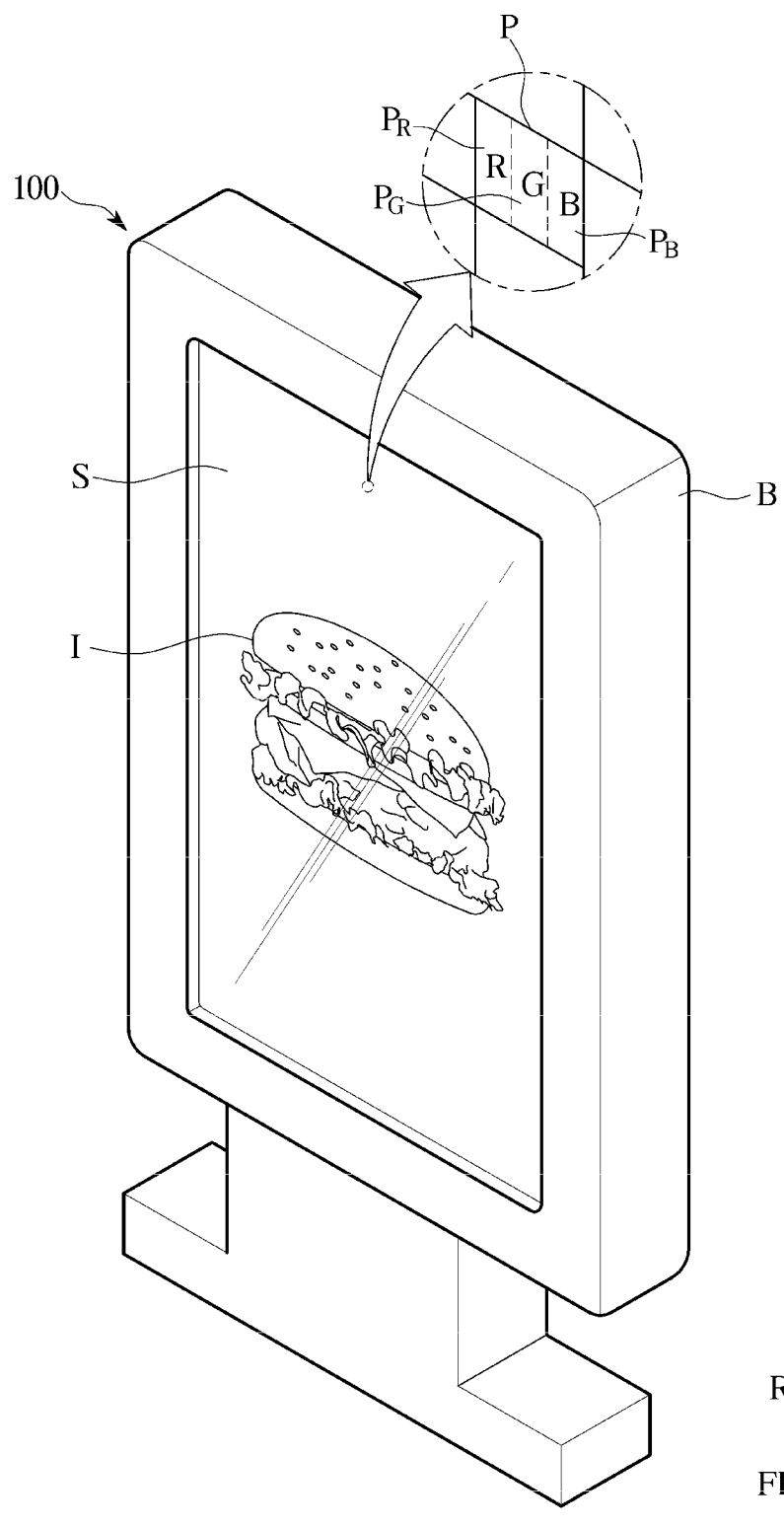
FIG. 1 shows a display apparatus according to an embodiment of the disclosure.
Figure 1:
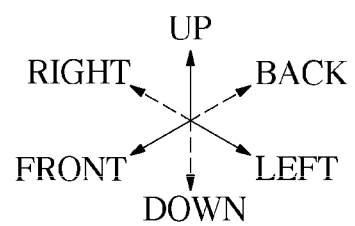

Throughout this specification, like reference numerals will refer to like components. The present specification does not describe all elements of embodiments, and descriptions about content being general in the technical art to which the disclosure belongs or overlapping content between the embodiments will be omitted. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

Through this specification, it will be understood that when a certain part is referred to as being "connected" to another part, it can be directly or indirectly connected to the other part. When a part is indirectly connected to another part, it may be connected to the other part through a wireless communication network.

Also, it will be understood that when a certain part "includes" a certain component, the part does not exclude another component but can further include another component, unless the context clearly dictates otherwise.

In the entire specification, it will also be understood that when an element is referred to as being "on" or "over" another element, it can be directly on the other element or intervening elements may also be present.

It will be understood that, although the terms "first", "second", etc., may be used herein to describe various elements, these elements should not be limited by these terms. The above terms are used only to distinguish one component from another.

An expression used in the singular encompasses the expression of the plural, unless it has a clearly different meaning in the context.

Reference numerals used in operations are provided for convenience of description, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Hereinafter, an operation principle and embodiments of the disclosure will be described with reference to the accompanying drawings.

FIG. 1 shows a display apparatus according to an embodiment of the disclosure.

A display apparatus 100 may be used to process image data received from outside and image data stored therein and visually display the processed image data. A purpose, type, shape, etc. of the display apparatus 100 are not limited. For example, the display apparatus 100 may be implemented as various types, such as a television (TV), a monitor, kiosk, a mobile multimedia apparatus, a mobile communication apparatus, a mobile calculator, etc., as long as the display apparatus 100 visually displays images.

Also, the display apparatus 100 may be installed at an outdoor place, such as the rooftop of a building and a bus stop, as well as an indoor place, such as an airport, a subway station, a shopping mall, a theater, and an office.

Also, the display apparatus 100 may be installed at any place where many unspecified peoples move, or at a place where a specific person resides. As such, an installation place of the display apparatus 100 is not limited.

The display apparatus 100 may receive a video signal and an audio signal from various content sources, and output video and audio corresponding to the video signal and the audio signal. For example, the display apparatus 100 may receive television broadcasting content through a broadcasting receiver antenna or a wired cable, content from a content reproducing apparatus, or content from a content providing server on a network.

As shown in FIG. 1, the display apparatus 100 may include a main body B accommodating a plurality of components for displaying an image I, and a screen S positioned on one side of the main body B to display the image I.

The main body B may form an outer appearance of the display apparatus 100, and components for enabling the display apparatus 100 to display the image I may be provided in inside of the main body B. The main body B shown in FIG. 1 may be in a shape of a flat plate. However, the shape of the main body B is not limited to the shape shown in FIG. 1. For example, the main body B may have a curved shape of which left and right ends protrude forward and of which a center portion is concave.

The screen S may be positioned on a front side of the main body B, and the image I which is visual information may be displayed on the screen S. For example, a still image or a moving image may be displayed on the screen S, and a 2Dimensional (2D) planar image or a 3Dimensional (3D) stereoscopic image may be displayed on the screen S.

A plurality of pixels P may be formed on the screen S, and the image I displayed on the screen S may be formed by a combination of light emitted from the plurality of pixels P. For example, light emitted from the plurality of pixels P may be combined like mosaic to form an image I on the screen S.

The plurality of pixels P may emit light of different brightness levels and/or different colors, respectively.

Each of the plurality of pixels P may include a plurality of point light sources (for example, organic light emitting diodes) capable of themselves emitting light, or a plurality of shutters (for example, a liquid crystal panel) capable of transmitting or blocking light emitted by a surface light source such as a backlight unit, etc.

Each of the plurality of pixels P may include sub pixels Pr, Pg, and Pb. The sub pixels Pr, Pg, and Pb may include a red sub pixel Pr capable of emitting red light, a green sub pixel Pg capable of emitting green light, and a blue sub pixel Pb capable of emitting blue light. For example, the red light may correspond to light of a wavelength range from about 620 nm (nanometer, one billionth of a meter) to about 750 nm, green light may correspond to light of a wavelength range from about 495 nm to about 570 nm, and blue light may correspond to light of a wavelength range from about 450 nm to about 495 nm.

On the screen S or at an edge portion of the screen S, a touch sensor for sensing a user's touch may be positioned.

The touch sensor may be, for example, an infrared touch frame, a capacitive touch panel, or a resistive touch panel. The infrared touch frame may be positioned at the edge portion of the screen S to sense a user's touch by sensing a shade of the user's body part. The capacitive touch panel may be positioned on the screen S. The capacitive touch panel may sense a user's touch by sensing a change of capacitance by the user's contact or electrode. The resistive touch panel may also be positioned on the screen S, and sense a user's touch by sensing pressure by the user's contact.

Meanwhile, the display apparatus 100 according to an embodiment of the disclosure may be installed at a place, such as an airport or a subway station, where transportation facilities are provided.

In the present specification, a first display apparatus may be a display apparatus being close to a location at which a user rides in transportation.

Also, a second display apparatus may be a plurality of display apparatuses being on a path extending from the location at which the user rides in transportation.

The first display apparatus and the second display apparatus are named according to locations at which the first and second display apparatuses are positioned, and the first display apparatus and the second display apparatus may have the same configuration or different configurations.

Also, the first display apparatus and the second display apparatus may mean apparatuses themselves, or may be a display apparatus of outputting target content and a display apparatus of outputting indirect content, respectively.

Figure 2:
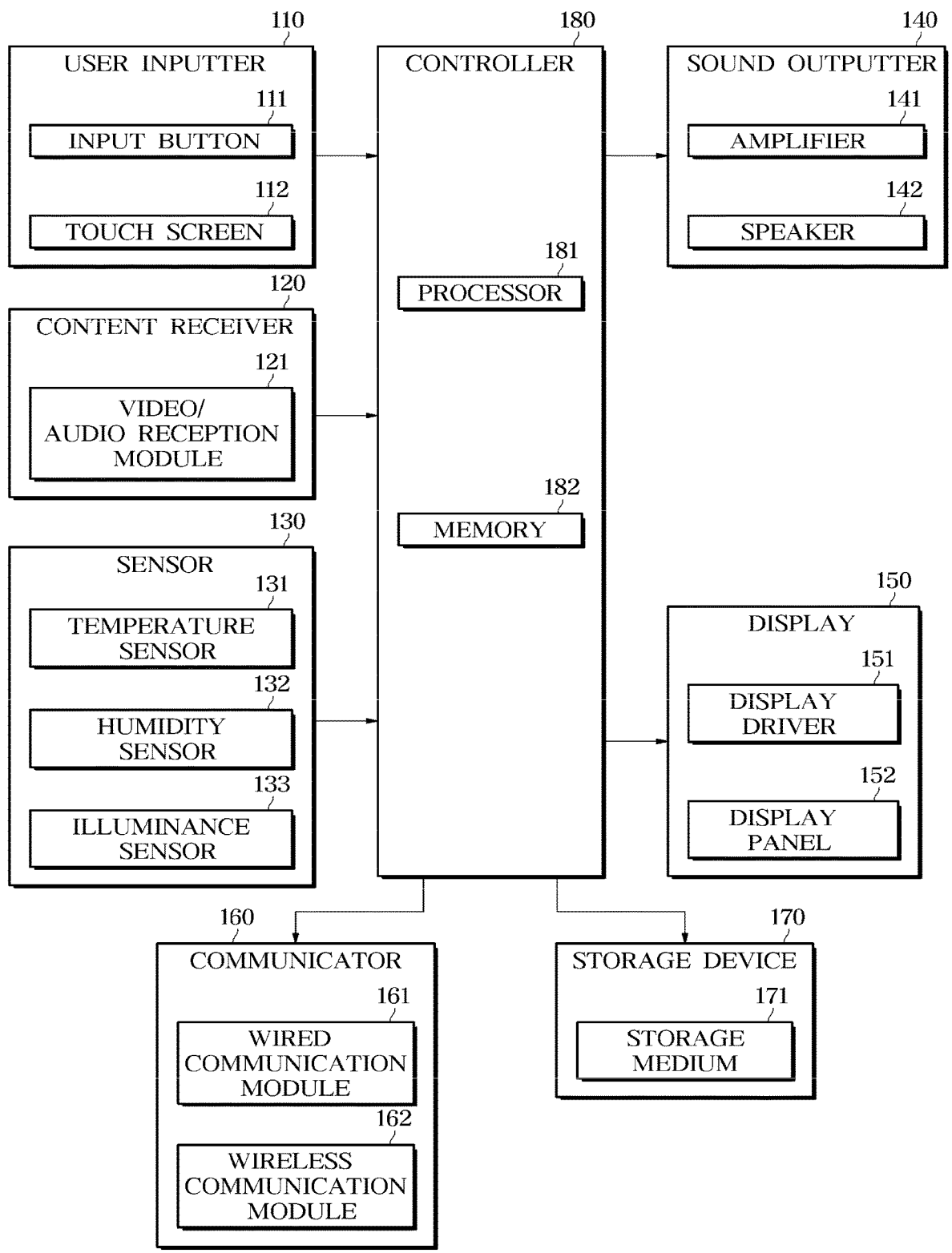
FIG. 2 shows a control configuration of a display apparatus according to an embodiment of the disclosure.

FIG. 2 shows a control configuration of a display apparatus according to an embodiment of the disclosure.

The display apparatus 100 may include a user inputter 110 for receiving a user input from the user, a content receiver 120 for receiving a video signal and/or an audio signal from content sources, a sensor 130 for collecting various operation information of the display apparatus 100, a sound outputter 140 for outputting sound, a display 150 for displaying images, a communicator 160 for communicating with external apparatuses, a storage device 170 for storing programs and data for controlling operations of the display apparatus 100, a cooler 190 for cooling inside of the display apparatus 100, and a controller 180 for processing the video signal and/or the audio signal received by the content receiver 120 and controlling operations of the display apparatus 100.

The user inputter 110 may include an input button 111 for receiving a user input. For example, the user inputter 110 may include a power button for turning on/off the display apparatus 100, a sound adjusting button for adjusting a volume of sound to be output from the display apparatus 100, a source selecting button for selecting a content source, etc.

The input button 111 may receive a user input, and output an electrical signal corresponding to the user input to the controller 180. The input button 111 may be implemented by various kinds of input devices, such as a push switch, a touch switch, a dial, a slide switch, a toggle switch, etc.

The user inputter 110 may include a touch screen 112 for sensing a user's approach or contact to the screen S. The touch screen 112 may include, for example, an infrared touch frame, a capacitive touch panel, or a resistive touch panel. The infrared touch frame may be positioned at the edge portion of the screen S, and sense a shade of a user's body part to sense the user's touch and detect a touch position. The capacitive touch panel may be positioned on the screen S, and sense a change of capacitance by a user's touch or approach to sense the user's touch and detect a touch position. The resistive touch panel may also be positioned on the screen S, and sense pressure by a user's contact to sense the user's touch and detect a touch position.

A user's touch input may be determined based on an image displayed on the screen S and a touch position detected by the touch screen 112. For example, an image for inducing a user's command or a user's selection may be displayed on the screen S, and the user's touch position may be detected by the touch screen 112. Through a comparison between the image displayed on the screen S and the touch position detected by the touch screen 112, the user's command, that is, the user's touch input may be determined.

The content receiver 120 may include a video/audio reception module 121 for receiving content including a video signal and/or an audio signal from content sources. The video/audio reception module 121 may receive a video signal and an audio signal from the content sources through a cable. For example, the video/audio reception module 121 may include a component (YPbPr/RGB) terminal, a composite video blanking and sync (CVBS) terminal, an audio terminal, a High Definition Multimedia Interface (HDMI) terminal, a Universal Serial Bus (USB) terminal, etc.

Optionally, the content receiver 120 may further include a tuner. The tuner may receive a broadcasting signal from a broadcasting receiver antenna or a wired cable, and extract a broadcasting signal of a channel selected by a user from the broadcasting signal. For example, the tuner may transmit a broadcasting signal having a frequency corresponding to a channel selected by a user among a plurality of broadcasting signals received through the broadcasting receiver antenna or the wired cable, and block the remaining broadcasting signals having the other frequencies.

As such, the content receiver 120 may receive a video signal and an audio signal from the content sources through the video/audio reception module 121, and output the video signal and/or audio signal received through the video/audio reception module 121 to the controller 180.

The sensor 130 may include a temperature sensor 131 for sensing inside temperature of the display apparatus 100, a humidity sensor 132 for sensing inside humidity of the display apparatus 100, and an illuminance sensor 133 for sensing external illuminance of the display apparatus 100.

The temperature sensor 131 may be installed inside the main body B. For example, the temperature sensor 131 may be mounted on a display panel 152 of the display 150 or on a printed circuit board (PCB) on which various kinds of electrical components are mounted.

The temperature sensor 131 may measure inside temperature of the display apparatus 100, and output an electrical signal corresponding to the measured temperature to the controller 180. The temperature sensor 131 may include, for example, a thermistor of which electrical resistance changes depending on temperature. The humidity sensor 132 may be provided inside the main body B. For example, the humidity sensor 132 may be mounted on the display panel 152 of the display 150 or on the PCB on which various kinds of electrical components are mounted.

The humidity sensor 132 may measure inside humidity of the display apparatus 100, and output an electrical signal corresponding to the measured humidity to the controller 180. The humidity sensor 132 may include, for example, a polymer material of which electrical resistance changes depending on ambient humidity or a polymer material of which capacitance changes depending on ambient humidity.

The illuminance sensor 133 may be exposed to the outside of the display apparatus 100. For example, the illuminance sensor 133 may be exposed to the outside of the display apparatus 100 through a hole formed at one side of a bezel of the main body B.

The illuminance sensor 133 may measure external illuminance of the display apparatus 100, and output an electrical signal corresponding to the measured illuminance to the controller 180. The illuminance sensor 133 may include a cadmium sulfide (CdS) sensor of which electrical resistance changes according to ambient brightness, or a photodiode device that outputs different voltages according to ambient brightness. The sound outputter 140 may include an amplifier 141 for amplifying sound, and a speaker 142 for aurally outputting the amplified sound.

The speaker 142 may convert an analog sound signal amplified by the amplifier 141 into sound (sound waves). For example, the speaker 142 may include a thin film vibrating according to an electrical sound signal, and sound waves may be generated by vibration of the thin film.

The display 150 may include the display panel 152 for visually displaying images, and a display driver 151 for driving the display panel 152.

The display panel 152 may generate an image according to image data received from the display driver 151, and display the image.

The display panel 152 may include a plurality of pixels each being a unit for displaying an image. Each pixel may receive an electrical signal representing an image from the display driver 151, and output an optical signal corresponding to the received electrical signal. As such, optical signals output from the plurality of pixels may be combined so that an image may be displayed on the display panel 152.

The display apparatus 100 may include various types of display panels 152 for displaying an image. For example, the display apparatus 100 may include a self-emissive display panel that displays an image by using a device itself emitting light. Representative examples of the self-emissive display panel are a Light Emitting Diode (LED) panel and an Organic Light Emitting Diode (OLED) panel. As another example, the display apparatus 100 may include a non-emissive display panel that transmits or blocks light emitted from a light source (a backlight unit) to display an image. A representative example of the non-emissive display panel is a Liquid Crystal Display (LCD) panel.

The display driver 151 may receive image data from the controller 180, and drive the display panel 152 to display an image corresponding to the received image data. The display driver 151 may transfer the image data to each of the plurality of pixels included in the display panel 152. Each pixel may emit light depending on the received image data, and the emitted light may be combined to form an image.

The communicator 160 may include a wired communication module 161 for receiving content data from a content source in a wired manner, and a wireless communication module 162 for receiving content data from a content source in a wireless manner.

The wired communication module 161 and the wireless communication module 162 included in the communicator 160 may receive a signal of a User Equipment (UE) and a position information signal of the UE.

The wired communication module 161 may receive content data from a content source by using various communication standards. For example, the wired communication module 161 may receive content data from a content source by using the Ethernet of the IEEE 802.3 standard.

The wired communication module 161 may include a communication circuit including a processor for decoding/encoding data for wired communication and/or a memory.

The wireless communication module 162 may be connected to an Access Point (AP) or a base station (BS) by using various wireless communication standards. Also, the wireless communication module 162 may receive content data from a content source via the AP or BS.

For example, the wireless communication module 162 may be connected to the AP by using a wireless communication standard, such as Wireless-Fidelity (Wi-Fi) (WiFi™, IEEE 802.11 standard), Bluetooth (Bluetooth™, IEEE 802.15.1 standard), or Zigbee (Zigbee™, IEEE 802.15.4 standard), and receive content data from a content source via the AR Also, the wireless communication module 162 may be connected to the BS by using a wireless communication standard, such as Code Division Multiple Access (CDMA), Wideband Code Division Multiple Access (WCDMA), Global System/Standard for Mobile Communications (GSM), Long Term Evolution (LTE), or Wireless Broadband Internet (Wibro), and receive content data from a content source via the BS.

The wireless communication module 162 may include a communication circuit including an antenna of transmitting and receiving wireless signals, a processor for decoding/encoding data for wireless communication, and/or a memory.

The storage device 170 may include a storage medium 171 storing data and programs for controlling operations of the display apparatus 100. Also, the storage device 170 may include a management circuit including a processor for managing data stored in the storage medium 171 and/or a memory.

For example, the storage medium 171 may store an operating system (OS) for managing a resource (for example, software and/or hardware of the display apparatus 100) included in the display apparatus 100, a video player for decoding content data and restoring an image, a management application for managing the display apparatus 100, etc. The storage medium 171 may store content data to be displayed by the display apparatus 100. For example, the storage medium 171 may store an image file resulting from compressing/encoding content data.

The storage medium 171 may include a non-volatile memory for preserving stored programs and data even when power is shut off. For example, the storage medium 171 may include a flash memory, a solid state drive (SSD), a hard disc drive, an optical disc drive, etc.

The cooler 190 may include a fan 191 for cooling inside of the main body B of the display apparatus 100 in response to a control signal from the controller 180. The fan 191 may discharge inside air of the main body B to outside of the main body B, or inhale outside air of the main body B to the inside of the main body B.

Electrical components included in the display apparatus 100 may be heated by current. For example, light sources included in the display apparatus 152 may emit heat together with light, and due to the display panel 152 heated, the inside air of the main body B may be heated, and inside temperature of the main body B may rise.

The fan 191 may discharge the heated inside air of the main body B to lower the inside temperature of the main body B, or inhale the outside air of the main body B to lower the inside temperature of the main body B. Also, the fan 191 may discharge the heated inside air of the main body B or inhale the outside air of the main body B to lower inside humidity of the main body B.

The controller 180 may include a processor 181 for processing content data, a user's touch input, etc., and a memory 182 for memorizing/storing processing data, such as the content data, the user's touch input, etc.

The memory 182 may store data and programs for processing content data, and temporarily memorize temporary content data generated while the content data is processed.

The memory 182 may store data and programs for controlling the display apparatus 100, and temporarily memorize temporary control data generated while the display apparatus 100 is controlled.

The memory 182 may include a non-volatile memory, such as Read Only Memory (ROM) and a flash memory, for storing data for a long time, and a volatile memory, such as Static Random Access Memory (S-RAM) and Dynamic Random Access Memory (D-RAM), for temporarily memorizing data.

The memory 182 may include a memory chip including a plurality of memory cores, or a plurality of memory chips.

The processor 181 may decode content data received through the communicator 160 and/or content data stored in the storage device 170, and output image data and sound data decoded from the content data. The image data may be displayed as an image through the display panel 152. The sound data may be output as sound through the speaker 142.

The processor 181 may output image data of an image for inducing a user's command or a user's selection to the display 150, and receive touch data representing the user's touch position from the user inputter 110. The processor 181 may determine the user's command, that is, the user's touch input based on the image data and the touch data. The processor 181 may output image data for displaying an image responding to the user's touch input to the display 150.

The processor 181 may include a processor chip including a plurality of cores, or a plurality of processor chips. For example, the processor 181 may include an image processor for image processing, a micro controller for processing a user's touch input and controlling operations of the display apparatus 100, etc.

Also, the processor 181 may be separated from the memory 182, or the processor 181 and the memory 182 may be integrated into one body.

As such, the controller 180 including the processor 181 and the memory 182 may process content data and/or a user's touch input, and display an image corresponding to the content data and/or an image responding to the user's touch input on the display panel 152 of the display 150.

The controller 180 may output content-of-interest determined based on path information including another display apparatus to the display 150.

The other display apparatus may be, when the display apparatus 100 is a first display apparatus, a plurality of second display apparatuses that are different from the first display apparatus.

Also, the other display apparatus may be, when the display apparatus 100 is a second display apparatus, another second display apparatus and a first display apparatus. Also, the controller 180 may output the content-of-interest based on communication between the wired and wireless communication modules 161 and 162 and the UE.

More specifically, the display apparatus 100 may determine that a user has approached the display apparatus 100 in response to a signal from a UE possessed by the user. In this case, the controller 180 may output content to raise an output effect of the content.

The controller 180 may output the content-of-interest based on a position information signal from the UE. More specifically, the wired and wireless communication modules 161 and 162 of the display apparatus 100 may receive position information of a UE, and determine that the UE approaches the display apparatus 100 based on the position information. In this case, the display apparatus 100 may output content to raise an output effect of the content.

Figure 3:
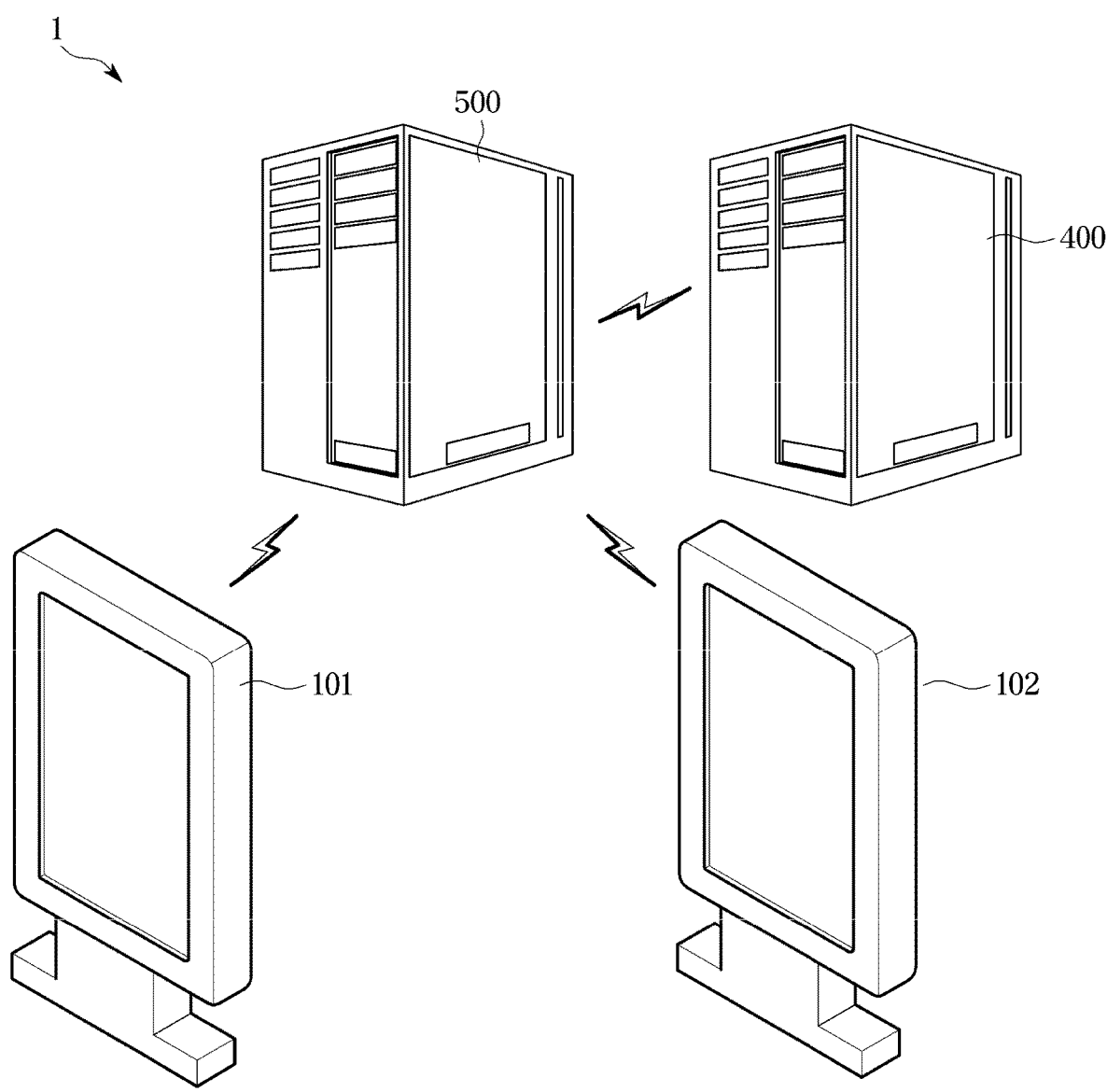
FIG. 3 shows a configuration of a display system according to an embodiment of the disclosure.

FIG. 3 shows a configuration of a display system 1 according to an embodiment of the disclosure.

The display system 1 according to an embodiment of the disclosure may include a first server 400, a second server 500, a first display apparatus 101, and a second display apparatus 102. The first server 400 may be a server providing user information to the second server 500. The first server 400 may deduce path information including a plurality of display apparatuses based on user information.

According to an embodiment of the disclosure, in some cases, the first server 400 may be implemented as a server installed at an airport, a server installed at a terminal, and a server installed at a hospital.

The first server 400 may determine at least one of path information including the first display apparatus 101 and the plurality of second display apparatuses 102.

The path information may represent a path including the second display apparatuses 102 and the first display apparatus 101. The path information may represent a path along which a user moves to ride in transportation, which will be described later. However, the path information may represent a correlation between the first display apparatus 101 and the plurality of second display apparatuses 102.

The second server 500 may output target content of content-of-interest to the first display apparatus 101 based on position information of the first display apparatus 101.

Also, the second server 500 may perform a control operation of outputting at least one of indirect content corresponding to the target content of the content-of-interest to the plurality of second display apparatuses 102. In the current specification, the content-of-interest may be an image, video, text, etc. to be output to each display apparatus.

Meanwhile, the target content included in the content-of-interest may include content that will be ultimately transferred in a signage system, and may be content that is output to the display apparatus 100.

Also, the indirect content included in the content-of-interest may be content directly or indirectly related to content that the target content will transfer.

In the present specification, an operation of outputting target content from a final display apparatus is described. However, there is no limit to the order of outputting indirect content and target content.

The second server 500 may output the target content to the first display apparatus 101, based on position information of the first display apparatus 101, corresponding to user information.

The user information may include at least one of departure point information, stop information, destination information, age information, or gender information.

The destination information may be, when the display apparatus 100 is installed at a place such as a terminal where public transportation is provided, a place to which a user wants to go. According to an embodiment of the disclosure, the destination information may represent a boarding gate of a plane, a bus, a subway, and the like.

The second server 500 may determine at least one of path information including the first display apparatus 101 and the plurality of second display apparatuses 102 based on the user information. That is, the first display apparatus 101 may be installed around a boarding gate, and the second server 500 may determine a path to the first display apparatus 101 by determining a second display apparatus 102 allowing an output to a place where the first display apparatus 101 is located.

The second server 500 may output the target content to the first display apparatus 101 based on destination information changing depending on a change of user information. That is, the second server 500 may change content to be output to the first display apparatus 101 to correspond to a change of a destination.

Also, the second server 500 may change path information based on the changed user information. In short, the second server 500 may change target content based on user information, and grouped indirect content may change according to the changed target content.

Also, the second server 500 may determine output times of target content and at least one of indirect content. An operation of determining output times will be described in detail, later.

The second server 500 may perform a control operation of outputting at least one of indirect content to the plurality of second display apparatuses 102 at predefined time intervals.

The second server 500 may determine output times of general content and at least one of indirect content to be output to the second display apparatuses 102.

The general content may be content related to the target content or content generated independently from the target content.

The second server 500 may further include a path determiner 520 (see FIG. 7) for determining path information based on position information of the first display apparatus 101, and an apparatus determiner 510 (see FIG. 7) for determining the first display apparatus 101 outputting target content and the second display apparatuses 102 outputting indirect content. The path determiner 520 and the apparatus determiner 510 may be implemented as at least one processor provided in the second server 500.

The second server 500 may correspond the first display apparatus 101 and the plurality of second display apparatuses 102 to path information.

The second server 500 may group at least one path information corresponding to target content. That is, the second server 500 may correspond target content to destination information based on a feature of the target content, and group the corresponded information to path information.

Also, the second server 500 may group the first display apparatus 101 and the plurality of second display apparatuses 102 corresponding to the target content.

The second server 500 may perform a control operation of outputting the target content and the indirect content based on communication between at least one communication module and a UE.

The second server 500 may receive a position information signal of the UE, and perform a control operation of outputting the target content and the indirect content based on a relation between the first display apparatus 101 and the plurality of second display apparatuses 102 and the position information signal of the UE.

Meanwhile, the second server 500 may be implemented as an application or hardware that performs independent functions. Also, the second server 500 may be implemented as a processor provided in each display apparatus. That is, at least one display apparatus may perform operations of the second server 500.

That is, the display apparatus may output corresponding content according to an approach of a UE to raise an output efficiency of the content.

At least one component may be added or omitted to correspond to performance of components of the display apparatus 100 and the display system 1 shown in FIGS. 2 and 3. Also, it will be readily appreciated by one of ordinary skill in the art that relative positions of the components may change to correspond to the performance or structure of the display system 1.

Meanwhile, the components shown in FIGS. 2 and 3 may be software and/or a hardware component, such as a Field Programmable Gate Array (FPGA) and an Application Specific Integrated Circuit (ASIC).

Figure 4:
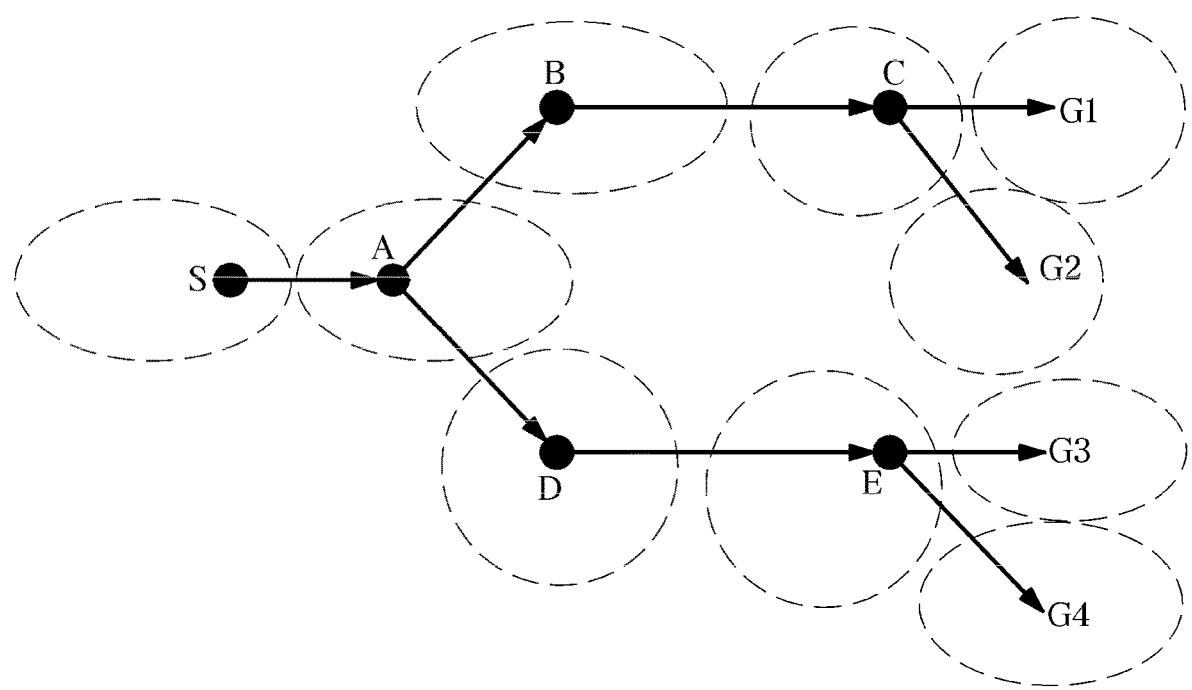
FIG. 4 shows path information according to an embodiment of the disclosure.
Figure 5:
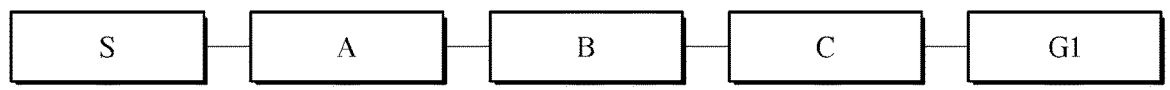
FIG. 5 is a view for describing path information according to an embodiment of the disclosure and display apparatuses corresponding to the path information.

FIG. 4 shows path information according to an embodiment of the disclosure, and FIG. 5 is a view for describing path information according to an embodiment of the disclosure and display apparatuses corresponding to the path information.

Referring to FIG. 4, FIG. 4 shows a case in which display apparatuses are installed at an airport, according to an embodiment of the disclosure, wherein S represents an airport entrance, and G1 to G4 represent boarding gates of the airport.

Meanwhile, A, B, C, D, and E of FIG. 4 represent information about positions of the display apparatuses installed at the airport, and may represent predefined areas at which the respective display apparatuses may be installed.

Meanwhile, the first server 400 may determine the path and the display apparatuses shown in FIG. 4 as path information of FIG. 5.

Referring to FIG. 5, in the case in which a flight for Hawaii departs from the boarding gate G1 at 11:00 on a specific date, the first server 400 may correspond path information of S-A-B-C-G1 to destination information of "Hawaii" to determine path information.

Meanwhile, in this case, the second server 500 may determine a display apparatus located at an area of the boarding gate G1 to be a first display apparatus, and output target content to the first display apparatus.

Also, in this case, the second server 500 may determine display apparatuses located at positions of S, A, B, and C to be second display apparatuses, and output indirect content to the second display apparatuses.

For example, in the case in which destination information is "Hawaii" as described above, the second server 500 may output direct advertisement content about items related to a honeymoon to the first display apparatus.

Also, the second display apparatus may output related images of the items related to the honeymoon, instead of generating content of the items related to the honeymoon and outputting the content.

More specifically, the second server 500 may provide a story advertisement connected to the target content through the indirect content. Also, the second server 500 may output indirect appeal content as the indirect content.

Meanwhile, display apparatuses included in a group of the positions S, A, B, C, D, E, G1, G2, G3, and G4 may be determined as a group of apparatuses being within a predefined range. Also, a display apparatus may be included in common in different pieces of path information. For example, a display apparatus provided at the position A shown in FIG. 4 may be included in common in path information including the boarding gates G1 and G2 and path information including the boarding gates G3 and G4.

Meanwhile, in the case of the airport as shown in FIGS. 4 and 5, gate locations do not change, and paths for moving to the corresponding gates also do not change.

However, destinations of flights departing from each gate change over time, and the destinations of the flights may change in real time by an airport server, that is, the first server 400. The first server 400 may receive gate information from an airport system to characterize path information, and accordingly, the same physical path may be treated as paths having different characteristics.

For example, referring to FIG. 5, the first server 400 may determine destination information of the boarding gate G1 to be "Hawaii" at 11:00 on a specific date, and determine destination information of the boarding gate G1 to be "Maldives" at 13:00 on the same date.

Meanwhile, operations described above with reference to FIGS. 4 and 5 are an example, and path information, destination information, and display apparatuses corresponding to the path information and destination information are not limited.

Figure 6:
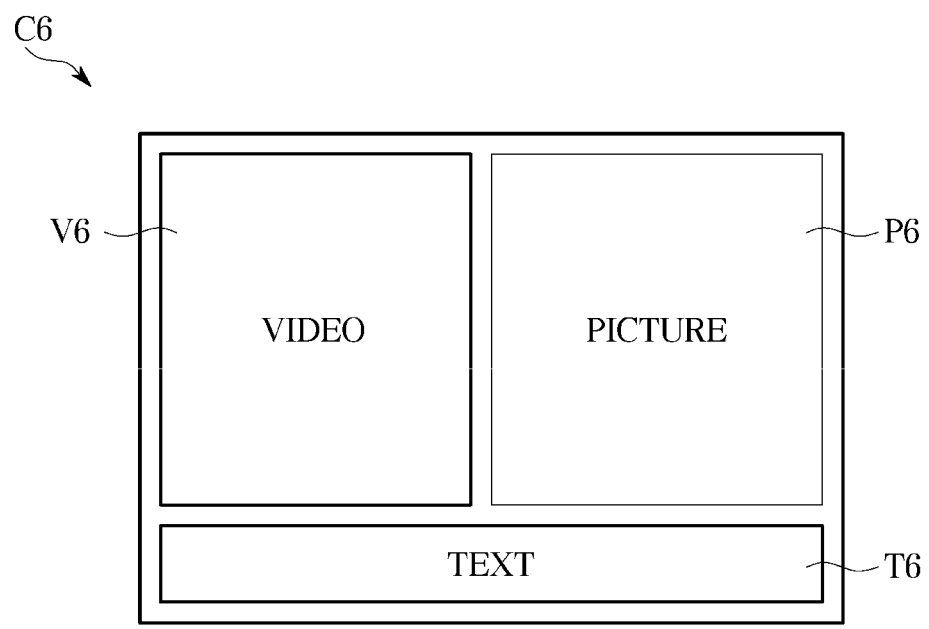
FIG. 6 is a view for describing content according to an embodiment of the disclosure.

FIG. 6 is a view for describing content C6 according to an embodiment of the disclosure.

In the present specification, content-of-interest may be content determined by user information, and include target content and indirect content.

Also, general content may be content related to content-of-interest or content unrelated to content-of-interest.

The content C6 may be registered in the second server 500.

The content C6 may be element unit content, such as an image P6, video V6, and text T6.

Meanwhile, the content C6 may be project unit content produced by using an image, video, a text element, etc. according to a production company.

An advertiser may register target content and indirect content in a server, group the target content and indirect content, and store the grouped content to reflect the grouped content to path information and output the grouped content.

The target content and indirect content may provide a story advertisement with directly connected contents, or may be indirectly exposed. The indirect content may be reproduced together with other content.

When a customer fails to recognize reproduction of indirect content and, after a while, target content is output, an advertisement effect may be more enhanced.

For example, tiredness caused by a long trip, massage shops located in an airport, etc. may be first output through indirect content.

Target content including ultimately targeted health food may be output.

Grouped content may be divided into indirect content and target content.

The second server 500 may output indirect content to the second display apparatuses 102, before outputting target content to the first display apparatus 101, based on path information.

However, in this case, the target content may be not necessarily reproduced after all the indirect content is reproduced, and the order of outputting the indirect content may change. That is, the order of outputting the target content and the indirect content is not limited.

Meanwhile, descriptions given above with reference to FIG. 6 is an embodiment of content, and, in the disclosure, the type of content that is output from the first display apparatus 101 and the second display apparatuses 102 is not limited.

Figure 7:
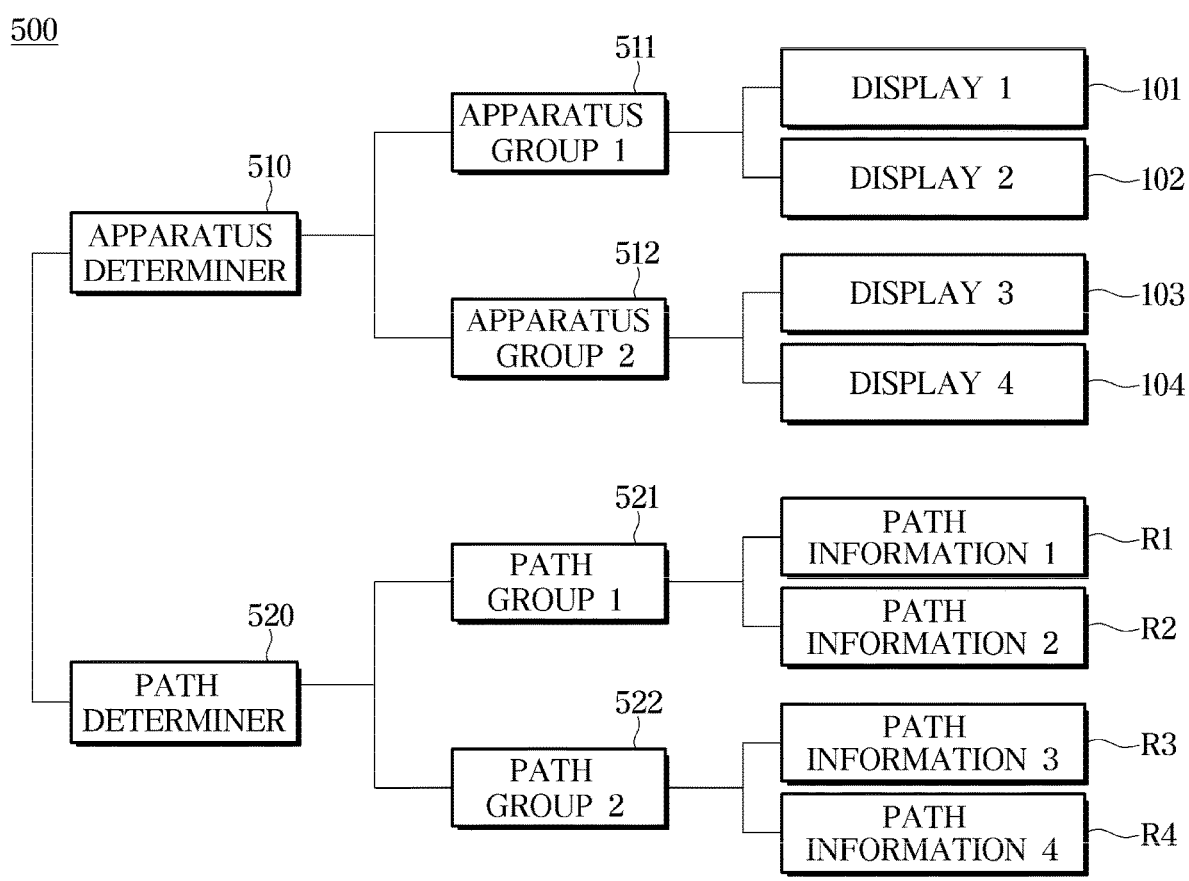
FIG. 7 shows a detailed configuration of a server for grouping paths and display apparatuses according to an embodiment of the disclosure.
Figure 8:
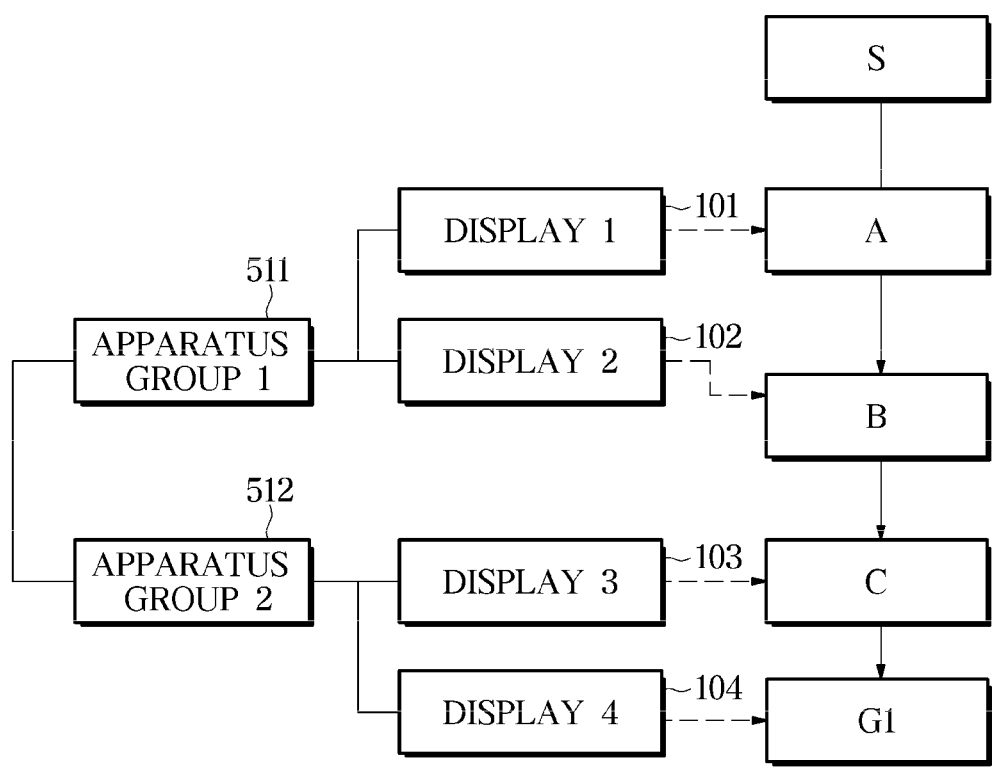
FIG. 8 is a view for describing an operation of corresponding display apparatuses according to an embodiment of the disclosure to path information.
Figure 9:
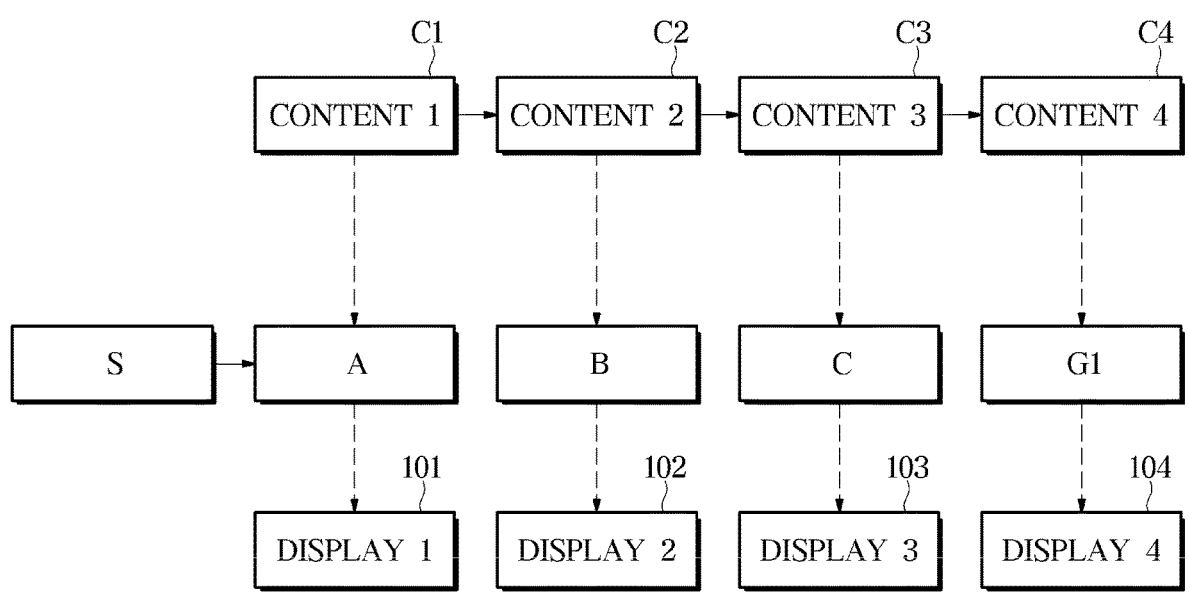
FIG. 9 is a view for describing an operation of corresponding content according to an embodiment of the disclosure to path information and display apparatuses.

FIG. 7 shows a detailed configuration of a server for grouping paths and display apparatuses according to an embodiment of the disclosure, FIG. 8 is a view for describing an operation of corresponding display apparatuses according to an embodiment of the disclosure to path information, and FIG. 9 is a view for describing an operation of corresponding content according to an embodiment of the disclosure to path information and display apparatuses.

Referring to FIG. 7, the apparatus determiner 510 may determine apparatus groups 511 and 512 configured with display apparatuses. Also, the path determiner 520 may determine path information based on destination information.

The path information may be determined by a method corresponding to a display apparatus.

Referring to FIG. 8, the apparatus determiner 510 may correspond a display apparatus corresponding to a path position to the corresponding path.

Referring to FIGS. 8 and 9, the second server 500 may correspond a display 1 101 to a path A, and a display 2 102 to a path B.

Also, the second server 500 may correspond a display 3 103 to a path C, and a display 4 104 to a path G1.

As described above, the second server 500 may determine the display 4 104 corresponding to the path G1 to be a first display apparatus that outputs target content.

The second server 500 may correspond each display apparatus to path information and further correspond each display apparatus to a position of each path to perform a control operation of outputting target content and indirect content through each display apparatus based on an operation which will be described later.

By corresponding each display apparatus to path information based on operation described above with reference to FIG. 8, target content C4 may be output through the display 4 104, and indirect content C1, C2, and C3 may be output through the display 1 101, the display 2 102, and the display 3 103.

Referring to FIGS. 8 and 9, to output content to each display apparatus, the second server 500 may determine target content and indirect content based on the target content for path information to generate a content reproduction schedule for each display apparatus.

Referring to FIG. 9, the indirect content C1, C2, and C3 related to the target content C4 that is output to the display 4 104 being the first display apparatus is shown.

Each of the indirect content C1, C2, and C3 may be output to the display 1 101 corresponding to the path A, the display 2 102 corresponding to the path B, and the display 3 103 corresponding to the path C, respectively.

The target content C4 and the indirect content C1, C2, and C3 may be grouped and stored in the second server 500.

Meanwhile, the content reproduction schedule generated by the second server 500 may be set such that the target content C4 and the indirect content C1, C2, and C3 are reproduced with time differences. Also, the indirect content C1, C2, and C3 may be output in such a way to be exposed several times at a specific time in relation to each other, instead of being continuously and repetitively reproduced on a specific apparatus at a specific time.

Meanwhile, in regard of path information determined by the first server 400, preferences of main moving users may change over time according to information about departure destinations for each gate of an airport.

The second server 500 may determine moving paths that match purposes of target advertisement content, based on the users' preference information, to configure a schedule.

Meanwhile, the first server 400 may correspond destination information to backpacking, a honeymoon, a family trip, a trip with parents, a business trip, etc. The second server 500 may group target content and indirect content based on the corresponding information.

The first server 400 may determine path information by applying the genders of visitors, an age range of the visitors, preferred products of the visitors, etc. to actual travel destinations based on information about the visitors.

Also, because a destination of a gate at which target content is output changes over time, the first server 400 may determine paths having different characteristics over time based on the corresponding information.

Meanwhile, operation described above with reference to FIGS. 7 to 9 is an embodiment in which content, paths, and display apparatuses correspond to each other, and operation of corresponding content, displays, and paths to each other is not limited.

Figure 10:
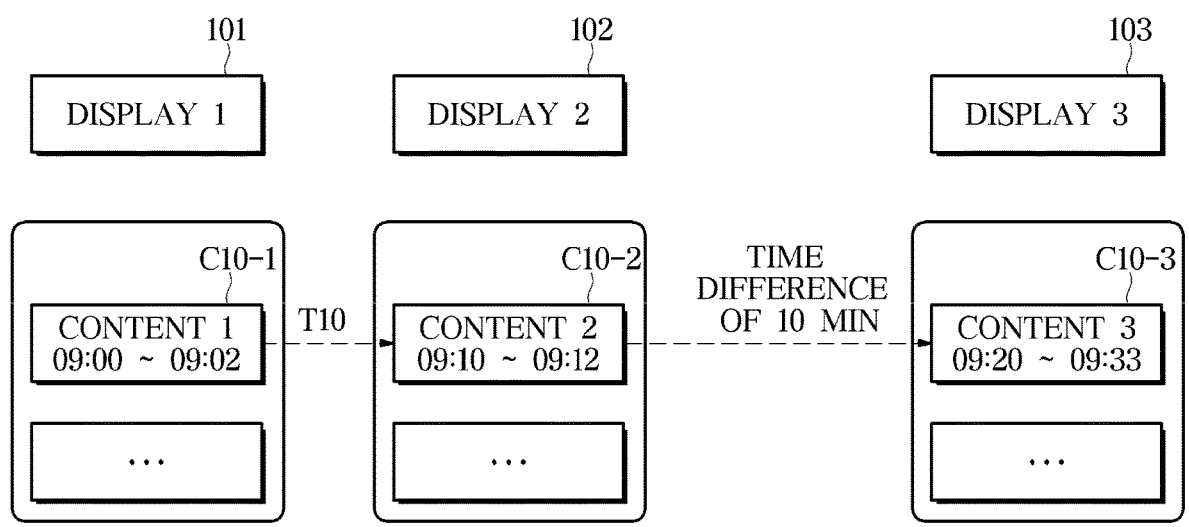
FIG. 10 is a view for describing an operation of determining an output time of indirect content according to an embodiment of the disclosure.

FIG. 10 is a view for describing an operation of determining an output time of indirect content according to an embodiment of the disclosure.

The second server 500 may determine output times of target content and at least one indirect content. More specifically, the second server 500 may perform a control operation of outputting at least one indirect content to a plurality of display apparatuses at predefined time intervals. In FIG. 10, a case of outputting indirect content 1 C10-1, indirect content 2 C10-2, and indirect content 3 C10-3 to the display 1 101, the display 2 102, and the display 3 103, respectively, is shown.

Also, the second server 500 may determine a time interval T10 between a time at which the indirect content 1 C10-1 is output to the display 1 101 and a time at which the indirect content 2 C10-2 is output to the display 2 102.

FIG. 10 shows an operation of outputting the indirect content 1 C10-1 and the indirect content 2 C10-2 to the display 1 101 and the display 2 102, respectively, with a time interval T10 of 10 minutes. The time interval T10 may be determined to be a time interval at which a user easily watches the corresponding content, and the time interval T10 may be determined by the second server 500 according to a kind of content.

Figure 11:
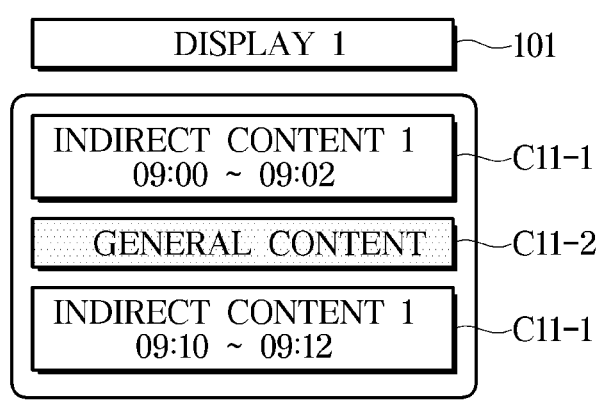
FIG. 11 is a view for describing an operation of outputting indirect content and general content according to an embodiment of the disclosure.

FIG. 11 is a view for describing an operation of outputting indirect content and general content according to an embodiment of the disclosure.

Referring to FIG. 11, an operation of outputting general content C11-2 between times at which the display 1 101 outputs indirect content C11-1 is shown.

That is, the second server 500 may output general content C11-2 between output times of individual pieces of content in determining an output time of content that is output through each display.

According to an embodiment of the disclosure, the second server 500 may output content in various ways by a method of generating a schedule of apparatus groups such that indirect content is exposed several times for a predefined time period and then filling general content in empty spaces.

Meanwhile, the operations described above with reference to FIGS. 10 and 11 are an embodiment of the disclosure, and an output time of each of content and an output operation of general content are not limited.

Figure 12:
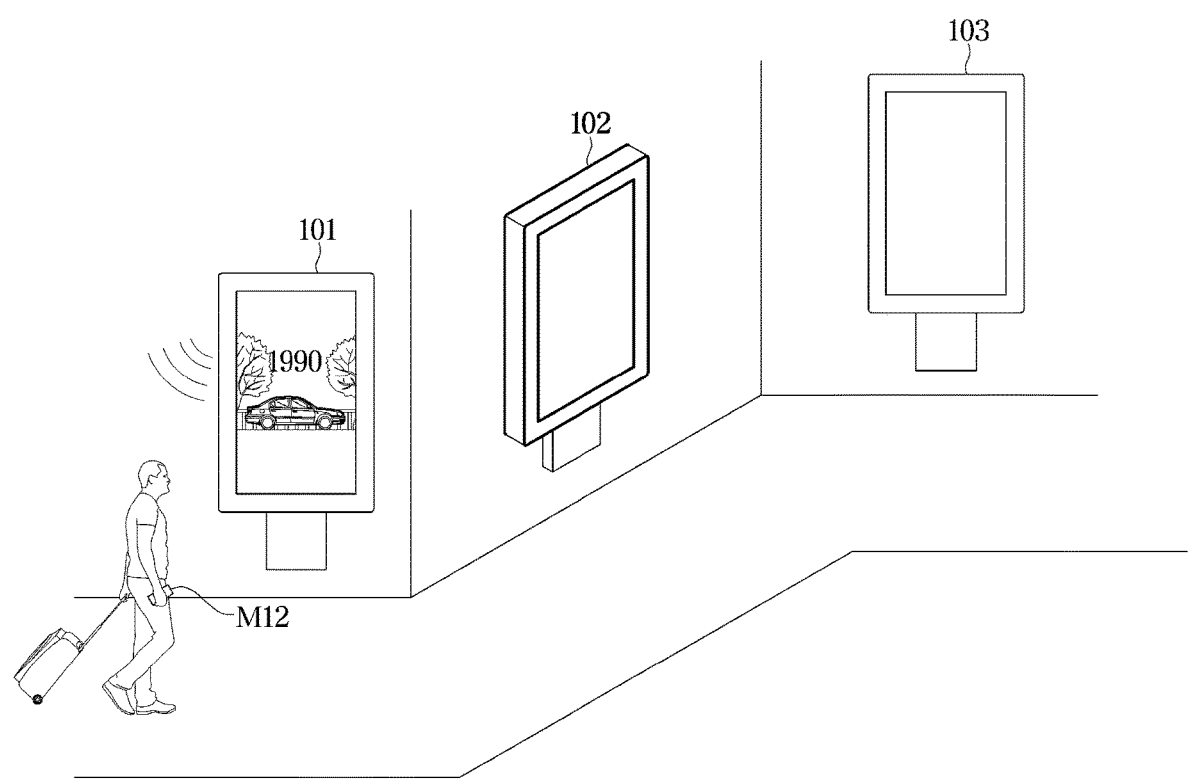
FIG. 12 is a view for describing an operation for outputting content based on a communication module of a display apparatus according to an embodiment of the disclosure.

FIG. 12 is a view for describing an operation for outputting content based on a communication module of a display apparatus according to an embodiment of the disclosure.

Each of a plurality of display apparatuses 101, 102, and 103 may include at least one communication module.

A server may perform a control operation of outputting target content and indirect content based on communication between at least one communication module and a UE M12. More specifically, the communication module included in each of the display apparatuses 101, 102, and 103 may perform wireless communication with the UE M12. For example, the display apparatus may perform wireless communication, such as Bluetooth, WiFi, Near Field Communication (NFC), and Zigbee, with the UE M12.

Because each display apparatus recognizes a user's approach based on the wireless communication, the server may output the corresponding content in response to a user's approach to the corresponding display apparatus 101, thereby raising an output effect of the content.

According to an embodiment of the disclosure, the display apparatus may include a camera. In this case, a user's approach to the display apparatus may be determined based on the camera included in the display apparatus, and the server may determine whether a user approaches the display apparatus based on an image obtained by the camera of the display apparatus. Also, the server may output indirect content and target content in response to a user's approach to the display apparatus, thereby raising an output effect of the content.

Figure 13:
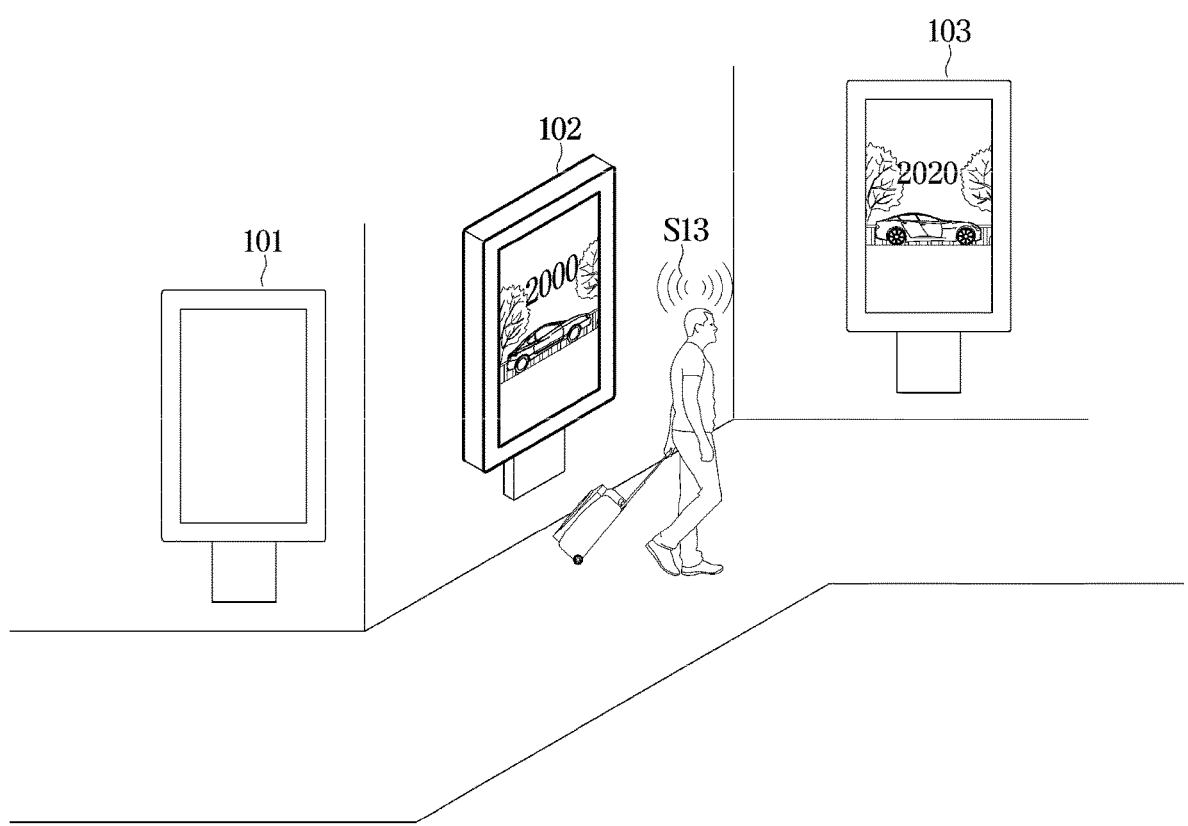
FIG. 13 is a view for describing an operation for outputting content based on a user's position information according to an embodiment of the disclosure.

FIG. 13 is a view for describing an operation for outputting content based on a user's position information according to an embodiment of the disclosure.

Referring to FIG. 13, the second server 500 may receive position information S13 of a UE around a display apparatus 101. Meanwhile, the display apparatuses 102 and 103 may also receive the user's position information. Meanwhile, the second server 500 may output content in response to a user's approach to a display apparatus based on the user's position information received by the second server 500 or the display apparatus. The second server 500 may output indirect content and target content in response to the user's approach to the display apparatus, thereby raising an output effect of the content.

Meanwhile, operations described above with reference to FIGS. 12 and 13 are an embodiment of the disclosure, and an operation of determining a user's position based on a UE and outputting content in a display apparatus and a server is not limited.

Figure 14:
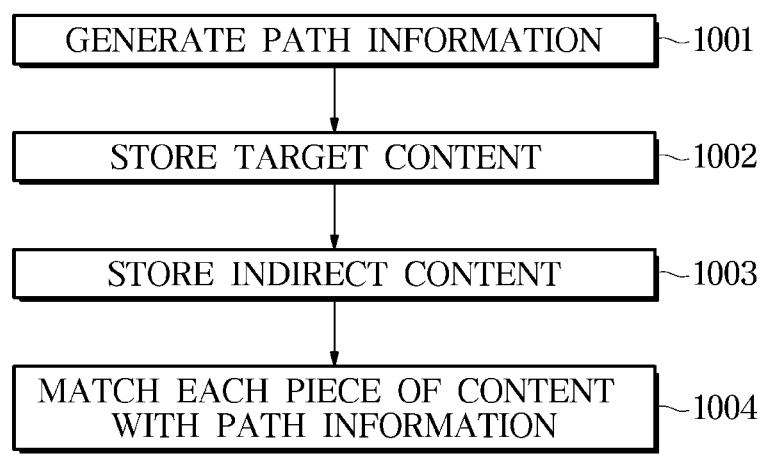
FIGS. 14 and 15 are flowcharts according to an embodiment of the disclosure.
Figure 15:
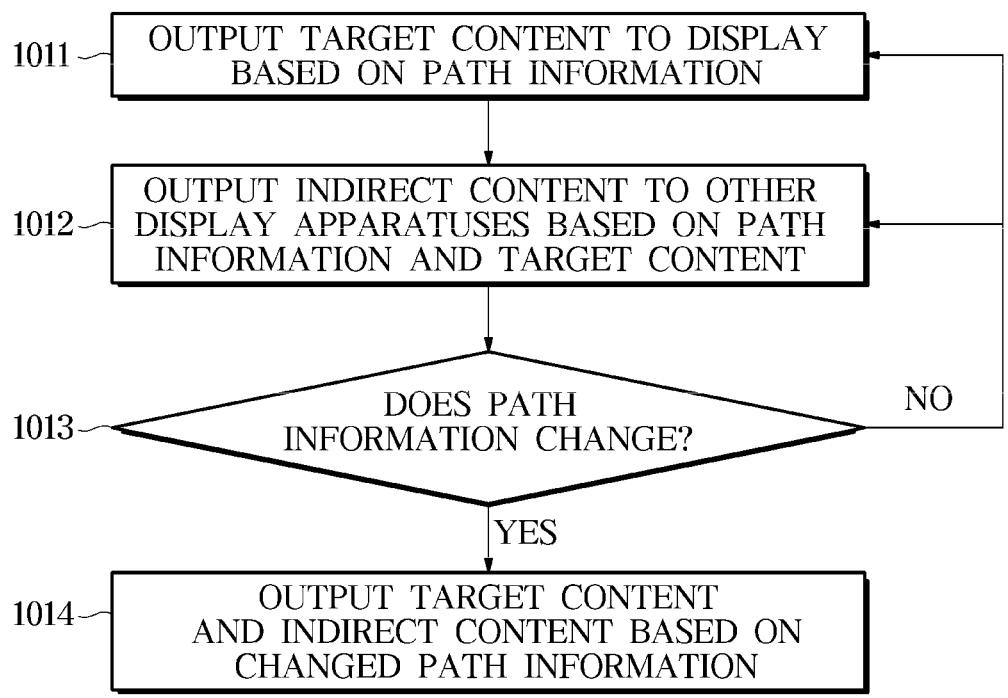

FIGS. 14 and 15 are flowcharts according to an embodiment of the disclosure.

Referring to FIG. 14, FIG. 14 shows an operation of storing target content and indirect content corresponding to path information.

A server may group a plurality of display apparatuses to generate path information, in operation 1001. Also, the server may store target content matching the path information corresponding to the grouped display apparatuses, in operation 1002. Indirect content corresponding to the target content may be related to the target content and stored in the server, in operation 1003. The server may match each content with path information, store the content matching with the path information, in operation 1004, and output the content matching with the path information based on a subsequent operation.

FIG. 15 is a flowchart for describing an operation of outputting target content and indirect content.

Referring to FIG. 15, a server may output target content to a display based on path information, in operation 1011.

Meanwhile, the server may output indirect content related to the path information and the target content to a plurality of other display apparatuses, in operation 1012.

Also, when the path information changes in operation 1013, the server may output target content and indirect content based on the changed path information, in operation 1014.

The display system, the control method of the display system, and the display apparatus according to an embodiment of the disclosure may improve delivery power of content by outputting content considering a user's moving path.

Meanwhile, the disclosed embodiments may be implemented in the form of a recording medium that stores instructions executable by a computer. The instructions may be stored in the form of a program code, and when executed by a processor, the instructions may create a program module to perform operations of the disclosed embodiments. The recording medium may be implemented as a computer-readable recording medium.

The computer-readable recording medium may include all kinds of recording media storing commands that can be interpreted by a computer. For example, the recording media may include Read Only Memory (ROM), Random Access Memory (RAM), a magnetic tape, a magnetic disc, flash memory, an optical data storage device, etc.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of controlling a display system including a plurality of display apparatuses provided in different locations, the method comprising:
    obtaining user information including a destination point of a user;
    generating path information including a path which the user moves from a starting point to the destination point based on the obtained user information, the path including positions of at least two display apparatuses of the plurality of display apparatuses;
    determining content-of-interest based on the obtained user information; and
    sequentially outputting, at a predetermined time interval, the determined content-of-interest to the at least two display apparatuses of the plurality of display apparatuses located along the path based on the generated path information.

2. The method of claim 1, wherein the content-of-interest includes target content and indirect content corresponding to the target content, and the outputting of the determined content-of-interest comprises
outputting the target content to a first display apparatus of the at least two display apparatuses based on position information, included in the generated path information, of the display apparatus, the first display apparatus located near the destination point, and
outputting the indirect content to a second display apparatus of the at least two display apparatuses based on position information, included in the generated path information, of the second display apparatus.

3. The method of claim 2, wherein the outputting of the determined content-of-interest further comprises outputting the target content to the first display apparatus based on the user information and the position information.

4. The method of claim 2, wherein the outputting of the determined content-of-interest to the at least one display apparatus further comprises outputting, in response to changing of the user information, the target content to the first display apparatus based on the changed user information.

5. The method of claim 2, wherein the generating of the path information comprises generating the path information based on the position information of the plurality of display apparatuses, and the outputting of the determined content-of-interest further comprises determining the first display apparatus to output the target content and determining the second display apparatus to output the indirect content.

6. The method of claim 5, wherein the outputting of the determined content-of-interest further comprises identifying the at least two display apparatuses located along the path based on the generated path information.

7. The method of claim 5, wherein the outputting of the determined content-of-interest comprises grouping the generated path information corresponding to the position information of the first display apparatus and the plurality of display apparatuses.

8. The method of claim 1, wherein the outputting of the determined content-of-interest comprises determining an output time of the content-of-interest.

9. The method of claim 8, wherein the outputting of the determined content-of-interest apparatus further comprises performing an operation of outputting the content-of-interest at selected time intervals.

10. The method of claim 1, wherein the plurality of display apparatuses comprise at least one communication module, and the outputting of the content-of-interest comprises performing an operation of outputting the content-of-interest based on communication between the at least one communication module and a user equipment (UE).

11. The method of claim 10, wherein the outputting of the content-of-interest further comprises:
receiving a position information signal of the UE; and
performing an operation of outputting the content-of-interest based on a relation between the at least two display apparatuses located along the path and the position information signal.

12. The method of claim 1, wherein the user information further includes one or more of starting point, stop, age, or gender.

13. A display system comprising:
a plurality of display apparatuses provided in different locations;
a first server configured to provide user information including a destination point of a user; and
a second server configured to receive the user information from the first server,
wherein the first server is configured to determine path information including a path which the user moves from a starting point to the destination point, based on the received user information, the path including positions of at least two display apparatuses of the plurality of display apparatuses and
the second server is configured to determine content-of-interest based on the received user information, and sequentially output, at a predetermined time interval, the determined content-of-interest to the at least two display apparatuses located along the path based on the determined path information received from the first server.

14. The display system of claim 13, wherein the content-of-interest includes target content and indirect content corresponding to the target content, and the second server is further configured to output the target content to a first display apparatus of the at least two display apparatuses based on position information, included in the determined path information, of the display apparatus, the first display apparatus located near the destination point, and output the indirect content to a second display apparatus of the at least two display apparatuses based on position information, included in the determined path information, of the other second display apparatus.

15. The display system of claim 14, wherein the second server is further configured to output the target content to the first display apparatus based on the received user information.

16. The display system of claim 14, wherein the second server is further configured to output, in response to a change of the user information, the target content to the first display apparatus based on the changed user information.

17. The display system of claim 14, wherein the second server further comprises:
a path determiner configured to determine the path information based on the position information of the plurality of display apparatuses; and
an apparatus determiner configured to determine the first display apparatus to output the target content and the second display apparatus to output the indirect content.

18. The display system of claim 17, wherein the second server is further configured to identify the at least two display apparatuses located along the path based on the path information.

19. The display system of claim 17, wherein the second server is further configured to group the path information corresponding to the position information of the first display apparatus and the plurality of display apparatuses.

20. The display system of claim 13, wherein the second server is further configured to determine an output time of the content-of-interest.

21. The display system of claim 20, wherein the second server is further configured to perform an operation of outputting the content-of-interest at selected time intervals.

22. The display system of claim 13, wherein the plurality of display apparatuses comprise at least one communication module, and the second server is further configured to perform an operation of outputting the content-of-interest based on communication between the at least one communication module and a user equipment (UE).

23. The display system of claim 13, wherein the second server is further configured to
receive a position information signal of the UE, and
perform an operation of outputting the content-of-interest based on a relation between the at least two display apparatuses located along the path and the position information signal.

\* \* \* \* \*

UNITED STATES PATENT AND TRADEMARK OFFICE
CERTIFICATE OF CORRECTION

| | |
|---|---|
| PATENT NO. | : 11,269,584 B2 |
| APPLICATION NO. | : 17/112142 |
| DATED | : March 8, 2022 |
| INVENTOR(S) | : Younggyoo Park et al. |

It is certified that error appears in the above-identified patent and that said Letters Patent is hereby corrected as shown below:

In the Claims

Column 19, Line 22-23:
In Claim 4, delete "to the at least one display apparatus further" and insert --further--

Column 20, Line 32:
In Claim 14, delete "other second" and insert --second--

Signed and Sealed this
Twenty-fourth Day of May, 2022

Katherine Kelly Vidal
*Director of the United States Patent and Trademark Office*